Patented Oct. 17, 1933

1,930,781

UNITED STATES PATENT OFFICE 1,930,781

WEED ERADICATION

Maurice C. Taylor, Niagara Falls, N. Y., assignor to The Mathieson Alkali Works, Inc., New York, N. Y., a corporation of Virginia No Drawing. Application December 19, 1932, Serial No. 647,958

6 Claims. (Cl. 47—58)

My invention relates to an improved process of destroying objectionable plant life. My process is applicable in cases in which it is desired completely to destroy all plant life in a particular area, and it is also applicable in cases in which it is desired selectively to destroy particular types of plant life in such areas, to kill weeds in areas infested therewith without permanent destruction of grass growing within those areas, for example.

I have discovered that the water soluble salts of chlorous acid, chlorites, are peculiarly toxic with respect to plant life and further that, under appropriate conditions, these salts are peculiarly effective as weed eradicators, being controllable in effect to act selectively in the destruction of weeds rather than grass.

This selective action of the chlorites is developed, in accordance with my invention, by restricting the proportion used. The general destruction of plant life is accomplished by using larger proportions.

In carrying out my process to kill weeds without destruction of grass, for example, I spray or sprinkle an aqueous solution of sodium chlorite over the infested area. Aqueous solutions containing about 5–15% by weight of sodium chlorite are useful in carrying out my process and such solutions may be applied to infested areas in amounts ranging, for example, from about ½ quart to about 2 quarts or somewhat less than 2 quarts per hundred square feet.

Sodium chlorite, and the water soluble chlorites as a class, are, as I have stated, toxic to plant life generally. Consequently, the immediate effect of my process may be an apparent killing of grass as well as weeds, particularly when larger proportions of the chlorite are applied per square foot of infested area, but when appropriately restricted proportions are used the selective action of the chlorite thereafter becomes apparent as the grass resumes growth whereas the weeds originally present are largely if not entirely destroyed.

It will be understood that various situations may require variations in the specific procedure just described by way of illustration. For example, the concentration of the solution may be varied, the solution may be applied at successive intervals, and the solution may be applied at different seasons for the purpose of eradicating different varieties of weeds. Also, instead of being applied as a solution, the chlorite may be applied as a dry powder.

In adidtion to the chlorite, the solution, or the powder, applied in carrying out my process may include, for example, water soluble acid agents such as monosodium phosphate. A treating solution may comprise, for example, 10% by weight of sodium chlorite and an amount of monosodium phosphate sufficient to saturate the solution.

The weeds in the selective destruction of which my invention is useful include plantain, teazel, cinquefoil, carrot, buckhorn, dog fennel, dock, thistle, pursley, dandelion and chickweed.

In carrying out my process completely to destroy plant life, for example, I likewise either spray or sprinkle the area involved with an aqueous solution of sodium chlorite or apply the sodium chlorite as a dry powder, but I use larger proportions than in cases in which selective destruction of weeds, for example, is intended, from two to five times the amounts per hundred square feet previously mentioned by way of specific illustration, for example.

The chlorites of the metals of the group comprising the alkali metals and the alkaline earth metals are particularly useful in carrying out the process of my invention. However, the water soluble chlorites generally are useful in carrying out my invention since the chlorite radical is the active component of the chlorite for the purposes of my invention.

As compared to chlorates for example, I have found chlorites to be more toxic, as evidenced by their more rapid action, and to have markedly more selective action in the killing of weeds without destruction of grass.

I claim:
1. A process of destroying plant life which comprises subjecting the area involved to treatment with a water soluble salt of chlorous acid.
2. A process of destroying plant life which comprises subjecting the area involved to treatment with a chlorite of a metal of the group comprising the alkali metals and the alkaline earth metals.
3. A process of selectively killing weeds which comprises subjecting the infested area to treatment with a restricted proportion of a water soluble salt of chlorous acid.
4. A process of selectively killing weeds which comprises subjecting the infested area to treatment with a restricted proportion of a chlorite of a metal of the group comprising the alkali metals and the alkaline earth metals.
5. A process of selectively killing weeds which comprises subjecting the infested area to treatment with an aqueous solution containing a restricted proportion of a chlorite of a metal of the group comprising the alkali metals and the alkaline earth metals.
6. A process of selectively killing weeds which comprises subjecting the infested area to treatment with an aqueous solution containing a restricted proportion of a water soluble salt of chlorous acid.

MAURICE C. TAYLOR.